June 9, 1964 J. L. GROSH 3,136,120
VARIABLE BURNING RATE CHARGE
Filed Feb. 27, 1961
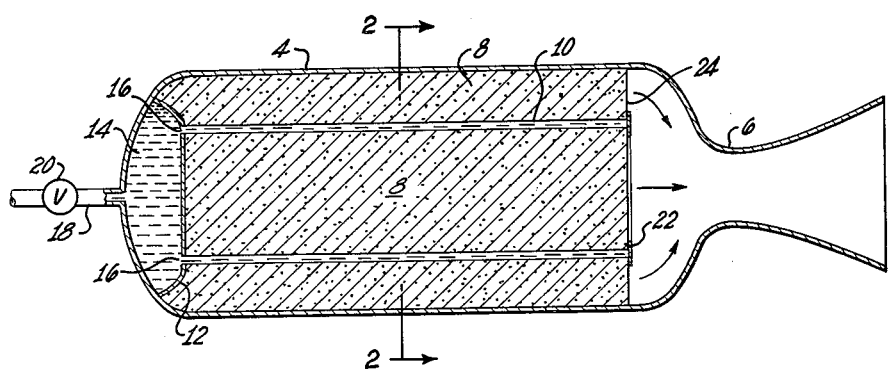
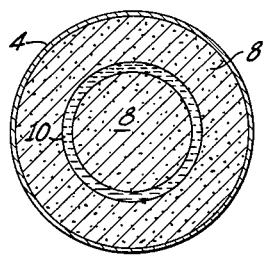 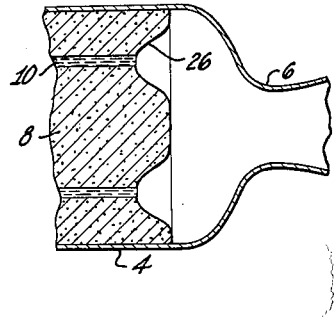
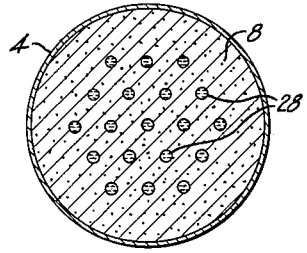
INVENTOR:—
JAMES L. GROSH
BY
ATTORNEYS

3,136,120
VARIABLE BURNING RATE CHARGE
James L. Grosh, Los Altos, Calif., assignor to United Aircraft Corporation, a corporation of Delaware
Filed Feb. 27, 1961, Ser. No. 91,830
4 Claims. (Cl. 60—35.6)

This invention relates to a gas generator employing a solid charge such as a solid propellant rocket engine. More particularly, the invention relates to a solid charge gas generator wherein provision is made for a controlled burning rate which can be changed upon command.

Gas generators employed a solid charge heretofore known such as solid propellant rocket engines have suffered from the defect that the rate of gas evolution is fixed prior to the ignition of the propellant by the choice of the propellant, size and configuration; after the charge is ignited, nothing can be done to increase or decrease the rate of gas evolution. For instance, solid propellant rocket engines have heretofore been relatively inflexible and much inferior to liquid propellant rockets in this respect.

In accordance with the present invention, a simple and effective method is provided for controlling the apparent burning rate and thus the rate of gas evolution from a solid charge gas generator which can be changed at will while the charge is burning. Generally speaking, the invention is carried out by providing one or more passages through the solid grain which passages may be filled with a liquid which restrains burning. It is well known that the rate of burning of a solid propellant rocket is directly related to the burning surface so that equal charges will produce vastly different rates of burning if the area of the burning surface is altered. Thus, if the liquid is withdrawn, the propellant will tend to burn into the passage or passages and the rate of gas evolution will be increased. On the other hand, if the liquid is forced into the passages it will restrict or prevent burning in the passages so that only the flat, front surface will provide a burning area and thus gas evolution will be at a minimum.

In the drawings forming part of this application:
FIGURE 1 is a sectional view of a rocket engine embodying the present invention.
FIGURE 2 is a sectional view on the line 2—2 of FIGURE 1.
FIGURE 3 is a partial sectional view, similar to a portion of FIGURE 1, showing the manner in which the burning rate is altered.
FIGURE 4 is a sectional view of a gas generator showing an alternate form of passage arrangement.

Turning now to a description of the drawings by reference characters, there is shown in FIGURES 1 and 2 a rocket engine having a casing 4 and a nozzle 6. A normal solid propellant grain 8 is contained within the casing said grain having an annular passage 10 therein. It will be understood that the annular passage 10 is given merely for purposes of illustration and that other forms of passages could be provided within the propellant grain. At the forward end of the engine a baffle 12 forms a reservoir 14. The baffle 12 has openings 16 therein so that the reservoir 14 is in fluid communication with the opening 10. A line 18 with valve 20 leads to a source of pressurized liquid, not shown. If desired, the passage 10 can be temporarily closed prior to ignition by the seal 22 which is of a suitable combustible material.

On FIGURE 4 an alternate form of passage is shown. Here a series of holes 28 is arranged in hexagonal form in the grain 8. Of course, the holes may be of any shape such as star, cruciform, slots or the like.

If the liquid is maintained within the passage 10 or 28 and the propellant grain is ignited, burning will take place only along the flat face and the burning front will maintain a substantially plane configuration as it recedes. On the other hand, should the restraining liquid be partially withdrawn from the passage 10, as is shown in FIGURE 3, burning can take place within the passages which will tend to form cones of greatly increased burning surface as at 26. The extent of the increased propellant burning surface will depend on the degree to which the liquid is withdrawn. Thus, the thrust of the rocket is increased by withdrawal of the restraining liquid. On the other hand, should less thrust be needed, the liquid injection can be started or resumed whereupon the liquid will cause the burning face to become flat again, lowering the evolution of gas. In this manner, the thrust of the rocket can be continuously varied while the rocket is in flight. Of course, the liquid which is injected will be volatilized and/or decomposed at the hot burning surface, and the extent of the loss of liquid will depend on the nature of the propellant charge, the size of the openings and the nature of the liquid. Liquid may be added at a rate which is less than the rate at which liquid is lost, so that the burning area can increase while liquid is being added if the rate of addition is less than the loss rate.

Suitable restraining liquids include water, ammonia hydrocarbon oils and halogenated hydrocarbons. These are given only by way of illustration, it being understood that any liquid or semi-liquid which can restrict the burning area can be employed.

I claim:
1. In a solid charge gas generator having a solid charge therein as its sole energy source, at least one passage through said charge intersecting a normal burning surface of the propellant charge and means for introducing a combustion restraining liquid into said passage whereby the rate of evolution of gas from the gas generator can be varied by changing the amount of liquid injected.
2. The generator of claim 1 wherein the passage is in the form of a cylinder.
3. The generator of claim 1 wherein a plurality of passages is provided in the charge.
4. In a solid propellant rocket engine having a solid propellant grain therein as its sole energy source, at least one passage through said grain intersecting a normal burning surface of the propellant grain, and means for introducing a combustion restraining liquid into said passage whereby the rate of evolution of gas from the rocket engine can be varied by changing the amount of liquid injected.

References Cited in the file of this patent
UNITED STATES PATENTS

| | | |
|---|---|---|
| 2,791,883 | Moore et al. | May 14, 1957 |
| 2,949,009 | D'Ooge | Aug. 16, 1960 |
| 2,984,973 | Stegelman | May 23, 1961 |
| 2,988,879 | Wise | June 20, 1961 |
| 3,017,748 | Burnside | Jan. 23, 1962 |